(12) United States Patent
Angelo

(10) Patent No.: US 11,820,436 B2
(45) Date of Patent: Nov. 21, 2023

(54) ARTICULATED WHEEL FAIRING FOR THE STEER AXLE

(71) Applicant: PACCAR Inc, Bellevue, WA (US)

(72) Inventor: Gerald Jay Angelo, Bellevue, WA (US)

(73) Assignee: PACCAR Inc, Bellevue, WA (US)

( * ) Notice: Subject to any disclaimer, the term of this patent is extended or adjusted under 35 U.S.C. 154(b) by 268 days.

(21) Appl. No.: 17/183,247

(22) Filed: Feb. 23, 2021

(65) Prior Publication Data

US 2021/0179187 A1   Jun. 17, 2021

Related U.S. Application Data

(63) Continuation of application No. 15/944,570, filed on Apr. 3, 2018, now Pat. No. 10,953,928.

(51) Int. Cl.
| | |
|---|---|
| *B62D 25/18* | (2006.01) |
| *B62D 35/00* | (2006.01) |
| *B62D 9/00* | (2006.01) |

(52) U.S. Cl.
CPC ............. *B62D 25/186* (2013.01); *B62D 9/00* (2013.01); *B62D 35/001* (2013.01)

(58) Field of Classification Search
CPC ....... B62D 25/186; B62D 35/001; B62D 9/00
See application file for complete search history.

(56) References Cited

U.S. PATENT DOCUMENTS

| | | | |
|---|---|---|---|
| 1,989,368 A | 1/1935 | Knapp | |
| 2,017,227 A * | 10/1935 | Barnhart | B62D 25/186 |
| | | | 280/849 |
| 3,784,226 A | 1/1974 | Wilfert et al. | |
| 5,056,860 A | 10/1991 | Cornacchia et al. | |

(Continued)

FOREIGN PATENT DOCUMENTS

| | | |
|---|---|---|
| CN | 103158793 A | 6/2013 |
| DE | 102015222174 A1 | 5/2017 |

(Continued)

OTHER PUBLICATIONS

Extended European Search Report dated Aug. 8, 2019, issued in corresponding European Application No. 19166987.8 filed Apr. 3, 2019, 23 pages.

*Primary Examiner* — Katy M Ebner
(74) *Attorney, Agent, or Firm* — SEED INTELLECTUAL PROPERTY LAW GROUP LLP

(57) ABSTRACT

Generally described, an articulated wheel fairing system for a vehicle having a steering system with a neutral steering input and a non-neutral steering input is provided. The articulated wheel fairing system provides clearance to the steer tire and wheel of the vehicle during non-neutral steering input, such as when the vehicle is turning at slower road speeds. The wheel fairing system generally includes an articulating fairing panel configured to cover at least a portion of the steer wheel, where the fairing panel movable from a first position adjacent to the steer wheel, such as when the vehicle is traveling at higher road speeds, to a second position outwardly from the first position. The wheel fairing system includes a mechanical linkage or actuator coupled to the fairing panel and the vehicle and configured to move the frame between the first position and the second position relative to the vehicle.

10 Claims, 13 Drawing Sheets

(56) References Cited

U.S. PATENT DOCUMENTS

| | | | |
|---|---|---|---|
| 5,074,573 A | 12/1991 | Dick | |
| 5,403,026 A | 4/1995 | Dahl | |
| 5,984,037 A | 11/1999 | Duhem | |
| 6,007,102 A * | 12/1999 | Helmus | B62D 25/182 280/847 |
| 6,349,954 B1 | 2/2002 | Deziel | |
| 7,380,869 B2 | 6/2008 | Nakaya | |
| 7,416,201 B2 | 8/2008 | Davey | |
| 7,481,442 B2 | 1/2009 | Lodi et al. | |
| 7,520,534 B2 * | 4/2009 | Longchamp | B62D 25/168 280/847 |
| 7,651,108 B2 | 1/2010 | Bonnaud et al. | |
| 7,793,985 B1 * | 9/2010 | Coloma | B62D 25/168 280/848 |
| 7,997,640 B1 | 8/2011 | Wurm | |
| 8,260,519 B2 * | 9/2012 | Canfield | B62D 35/00 701/74 |
| 8,388,003 B2 | 3/2013 | Wellman et al. | |
| 8,424,956 B2 | 4/2013 | Stimel | |
| 8,731,781 B2 * | 5/2014 | Prentice | B62D 35/02 296/180.1 |
| 8,979,102 B1 * | 3/2015 | Prentice | B62D 25/186 280/124.1 |
| 9,027,983 B2 | 5/2015 | Butler et al. | |
| 9,139,241 B1 | 9/2015 | Smith | |
| 9,193,392 B2 | 11/2015 | Lodi | |
| 9,238,490 B1 | 1/2016 | Smith | |
| 9,296,420 B2 | 3/2016 | Sasaki et al. | |
| 9,327,778 B2 | 5/2016 | Wolf | |
| 9,550,535 B2 | 1/2017 | Malone et al. | |
| 10,093,361 B2 * | 10/2018 | Wilson | B62D 25/182 |
| 10,118,585 B2 * | 11/2018 | Barron | B62D 25/02 |
| 10,494,033 B2 * | 12/2019 | Haeseker | B62D 25/186 |
| 11,040,742 B1 * | 6/2021 | Yankovich | B62D 25/188 |
| 11,072,374 B2 * | 7/2021 | Gandhi | B62D 25/02 |
| 11,472,496 B2 * | 10/2022 | Parry-Williams | B62D 35/02 |
| 2007/0182151 A1 | 8/2007 | Aulabaugh | |
| 2011/0080019 A1 * | 4/2011 | Castillo | B62D 25/16 296/180.1 |
| 2012/0013113 A1 * | 1/2012 | Trenne | B62D 25/182 280/849 |
| 2013/0096781 A1 * | 4/2013 | Reichenbach | B60Q 1/326 280/849 |
| 2016/0339972 A1 | 11/2016 | Beckon | |
| 2018/0257716 A1 | 9/2018 | Haeseker et al. | |
| 2019/0009831 A1 | 1/2019 | Albertson et al. | |
| 2019/0210657 A1 | 7/2019 | Gandhi et al. | |
| 2019/0270486 A1 * | 9/2019 | Del Gaizo | B62D 37/02 |

FOREIGN PATENT DOCUMENTS

| | | |
|---|---|---|
| JP | S59192678 A | 11/1984 |
| JP | H0288883 U | 7/1990 |

\* cited by examiner

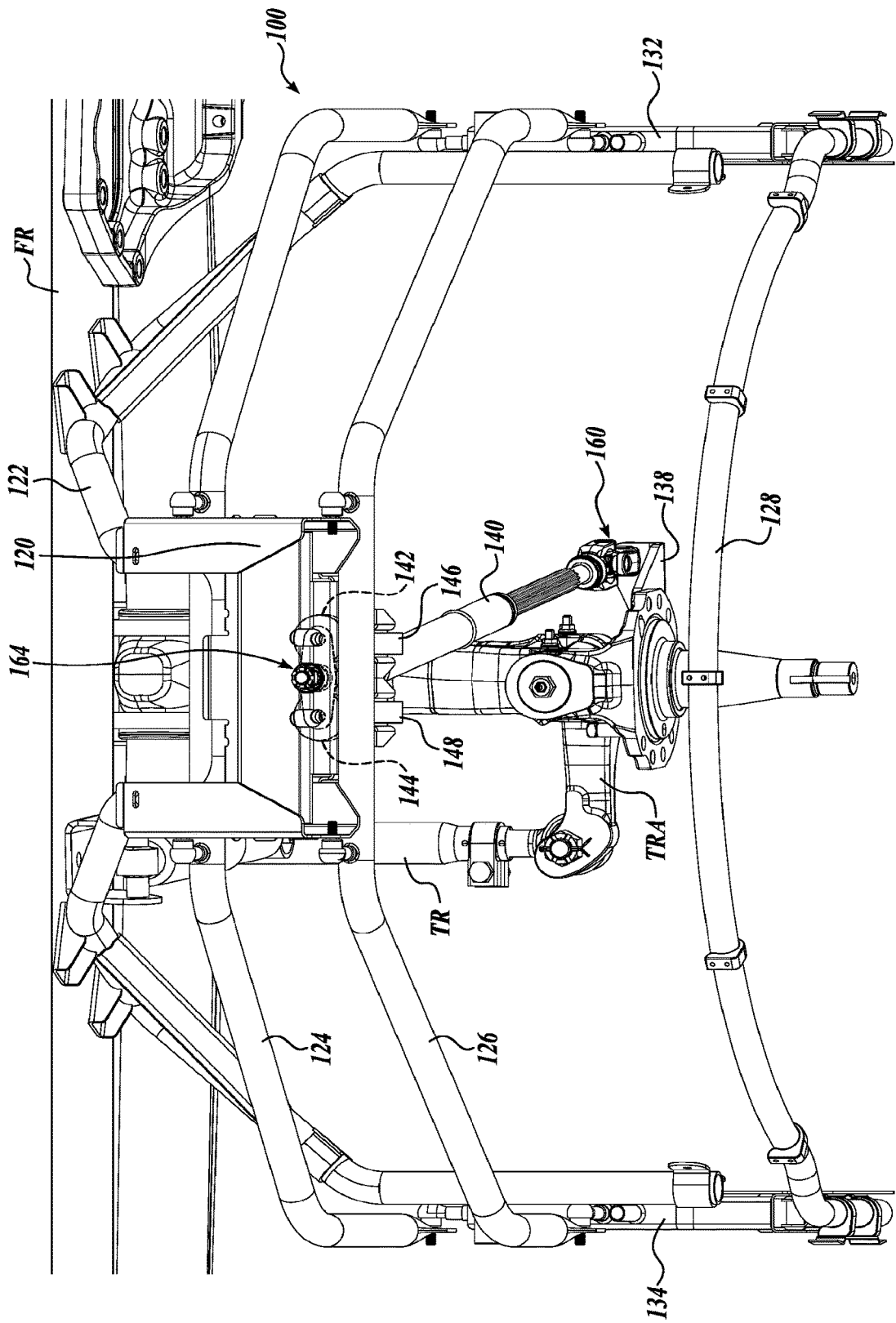

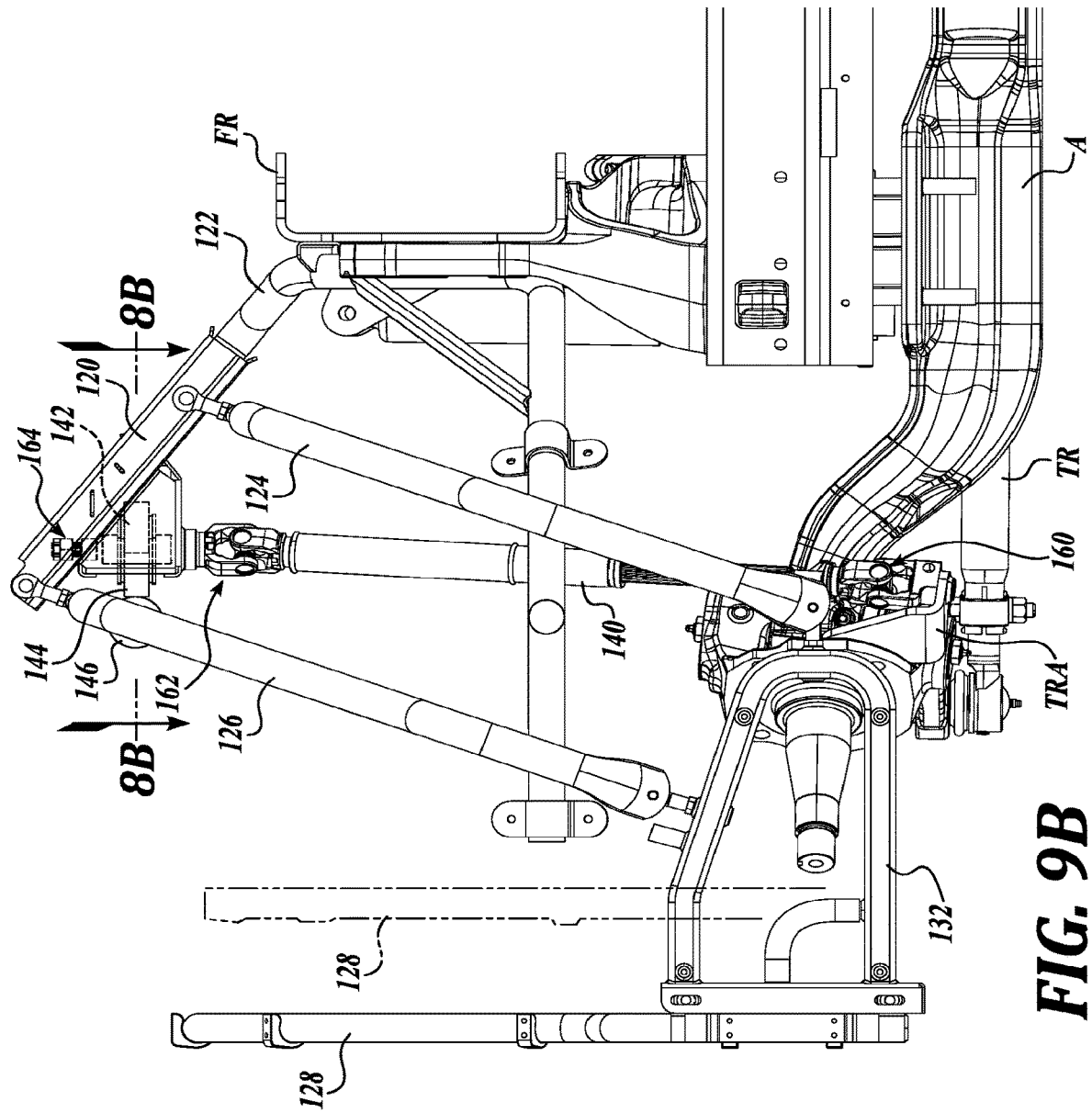

ARTICULATED WHEEL FAIRING FOR THE STEER AXLE

BACKGROUND

Numerous means have been sought to improve the fuel-efficiency of moving bodies and, especially, moving bluff bodies by reducing their aerodynamic drag. In the field of surface transportation, and particularly in the long-haul trucking industry, even small improvements in fuel efficiency can reduce annual operating costs significantly. It is therefore advantageous in the design of a vehicle to reduce drag forces, thereby increasing the aerodynamic properties and efficiency of the vehicle.

The over-the-highway cargo-hauling tractor-trailer combination is one vehicle that experiences excessive aerodynamic drag. Generally described, tractor-trailer combinations typically include a tractor having a so-called fifth wheel by which a box-like semi-trailer may be attached to the tractor by an articulated connection for transportation of the cargo trailer.

It is well known that features of bluff bodies, such as tractor-trailer combinations, and particularly features of the front-facing tractor of the combination, contribute significantly to aerodynamic drag, as evidenced by the formation of turbulence around the features of the tractor or truck. In one aspect, the wheels and wheel wells create turbulence, forming eddies, and can be contributed to the shape and motion of the wheels and wheel wells. The result is the creation of considerable aerodynamic drag.

SUMMARY

In accordance with one embodiment of the present disclosure an articulated wheel fairing system for a vehicle is provided. The articulated wheel fairing system has a steering system that includes a steer axle and a steer wheel. The steering system has a neutral steering input and a non-neutral steering input. The wheel fairing system generally includes a fairing panel configured to cover at least a portion of the steer wheel, the fairing panel movable from a first position, wherein the fairing panel may be positioned adjacent to the steer wheel, to a second position, wherein the fairing panel may be positioned outwardly from the first position laterally from a side of the vehicle. The wheel fairing system also includes an articulating unit coupled to the fairing panel and the vehicle. The articulating unit in some embodiments is configured to move the fairing panel between the first position and the second position relative to the vehicle, wherein the fairing panel may be in the first position when the steering system has neutral steering input, and wherein the fairing panel may move to the second position when the steering system has non-neutral steering input.

In accordance with another embodiment of the present disclosure an articulated wheel fairing system for a vehicle is provided. The articulated wheel fairing system has a steering system that includes a steer axle and a steer wheel. The steering system has a neutral steering input and a non-neutral steering input. The wheel fairing system generally includes a fairing panel configured to cover at least a portion of the steer wheel, the fairing panel movable from a first state to a second state. The wheel fairing system also includes an articulating mechanical linkage coupled to the fairing panel and the vehicle. The articulating mechanical linkage in some embodiments is configured to move the fairing panel between the first state and the second state relative to the vehicle, wherein the fairing panel may be in the first state when the steering system has neutral steering input, and wherein the fairing panel may move to the second state when the steering system has non-neutral steering input.

In accordance with any of the embodiments described herein, the articulating unit may include mechanical linkage coupled to the steer axle.

In accordance with any of the embodiments described herein, the wheel fairing system may further include a shaft configured to transfer motion of the steer axle to the mechanical linkage by twisting in reaction to movement of the steering system from the neutral steering input to the non-neutral steering input.

In accordance with any of the embodiments described herein, the shaft may include a slip joint to allow a change in length of the shaft, a first joint at a first end, and a second joint at a second end.

In accordance with any of the embodiments described herein, the shaft may be configured to rotate a lever positioned on the opposite side of the second joint from the shaft, the lever configured to interface with the articulating unit to move the fairing panel between the first and second positions.

In accordance with any of the embodiments described herein, the wheel fairing system may further include a splash shield positioned between the steer wheel and the mechanical linkage.

In accordance with any of the embodiments described herein, the articulating unit may include an actuator selected from the group consisting of a hydraulic actuator, an electronic actuator, a pneumatic actuator, and combinations thereof.

In accordance with any of the embodiments described herein, the actuator may be coupled to the fairing panel and to the vehicle.

In accordance with any of the embodiments described herein, the wheel fairing system may control a position of the actuator in response to a signal indicative of steering angle of the steering system.

In accordance with any of the embodiments described herein, the actuator may be continuously variable between the first position and the second position.

In accordance with any of the embodiments described herein, the fairing panel may be flush with a hood of a vehicle in the first position.

In accordance with any of the embodiments described herein, in the first state, the fairing panel may be positioned adjacent to the steer wheel, and wherein, in the second state, the fairing panel may be positioned outwardly from the first state laterally from a side of the vehicle.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein:

FIG. 7 is a left top perspective view of the articulated wheel fairing system of FIG. 6;

FIG. 9B is a front view of the articulated wheel fairing system of FIG. 6, showing the articulated wheel fairing system in the second position.

DETAILED DESCRIPTION

Figure 1A:
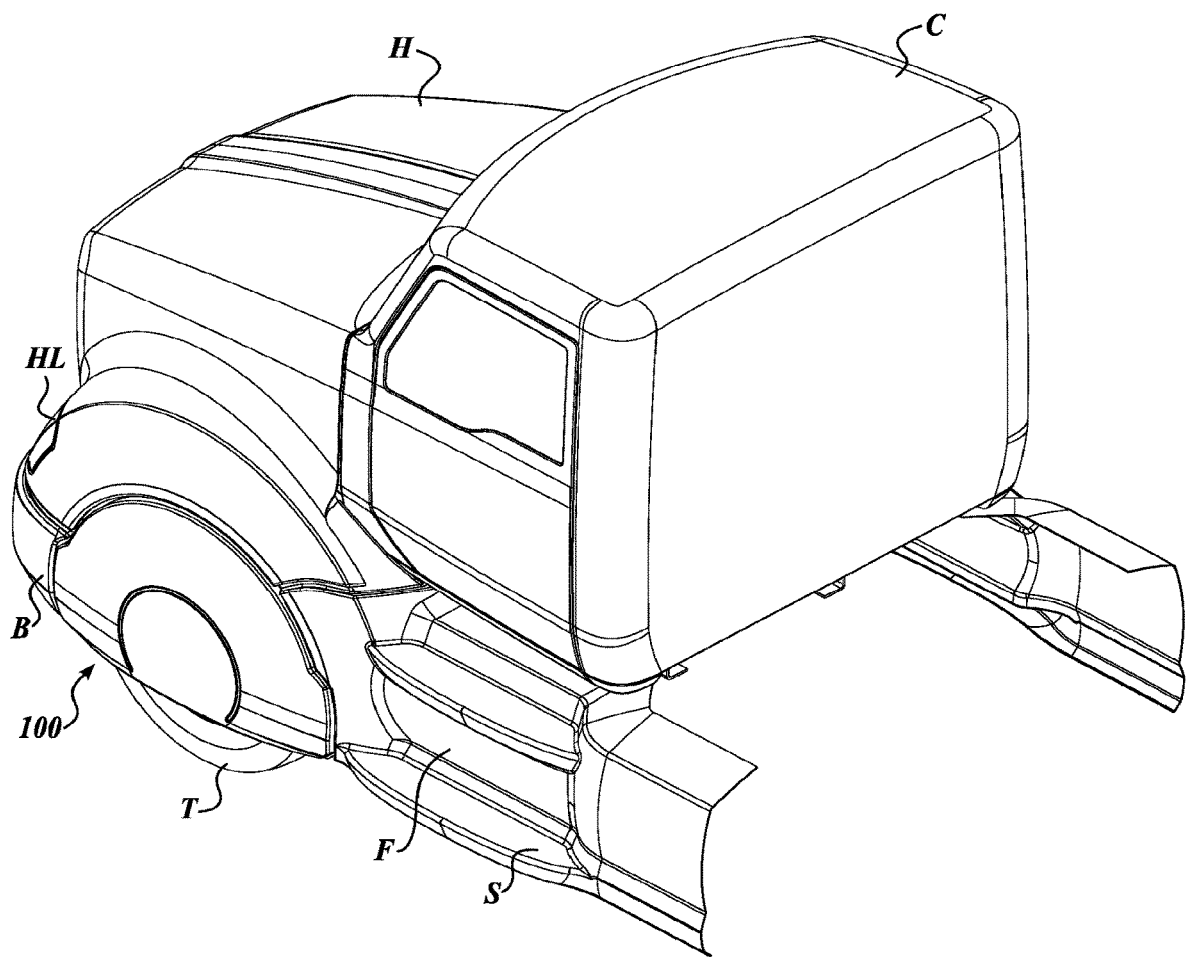
FIG. 1A is a right rear top perspective view of one representative embodiment of a vehicle having an articulated wheel fairing system in accordance with aspects of the present disclosure, showing the articulated wheel fairing system in a first position.
Figure 1B:
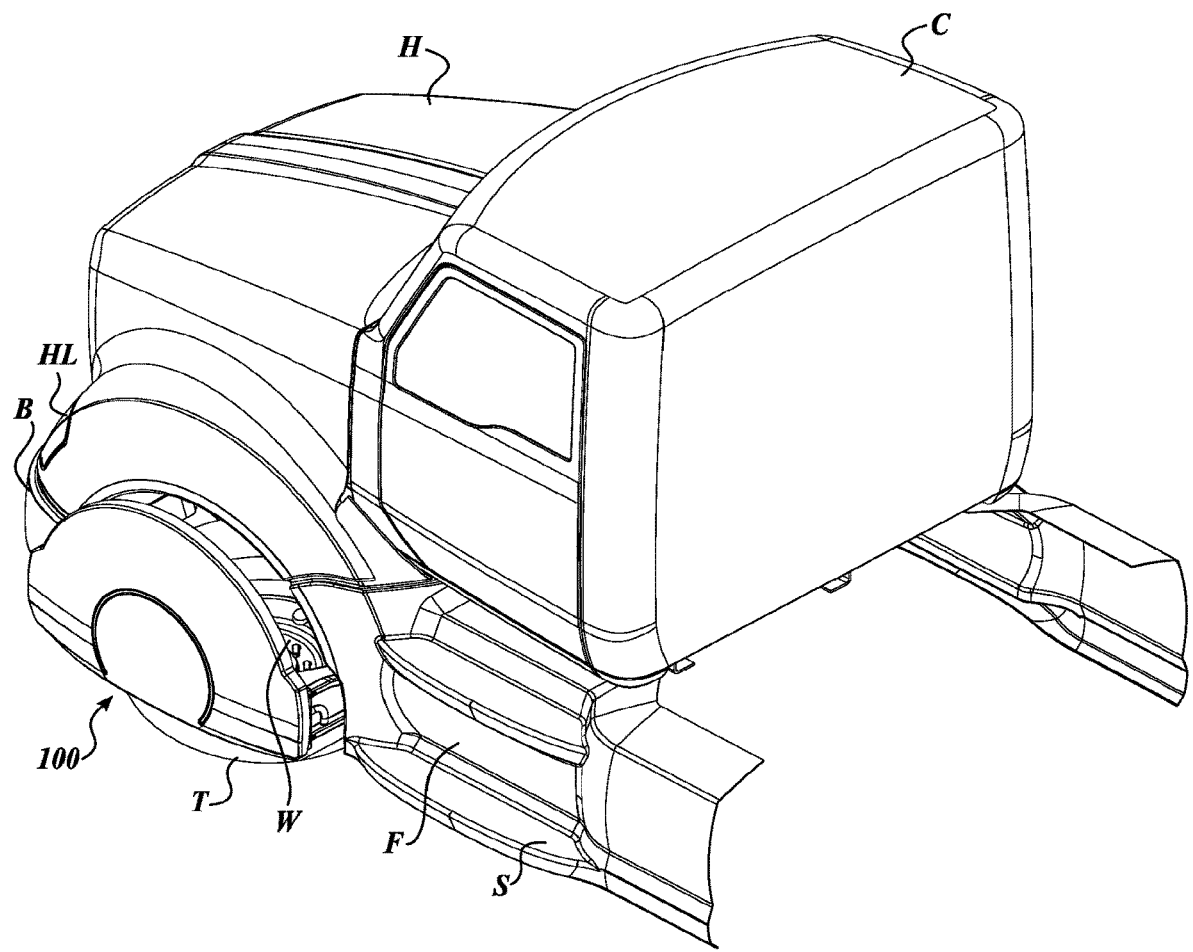
FIG. 1B is a right rear top perspective view of the vehicle having an articulated wheel fairing system of FIG. 1A, showing the articulated wheel fairing system in a second position.
Figure 2A:
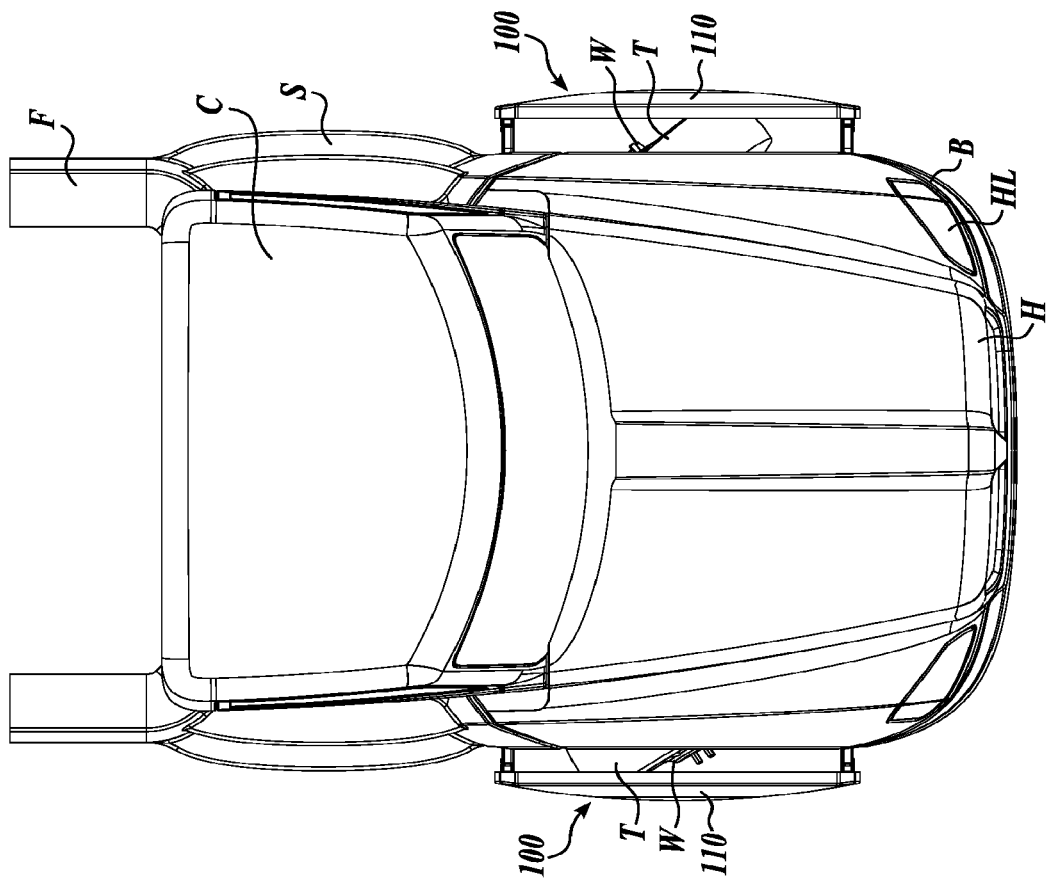
FIG. 2A is a top view of the vehicle having an articulated wheel fairing system of FIG. 1A, showing the articulated wheel fairing system in the first position.
Figure 2B:
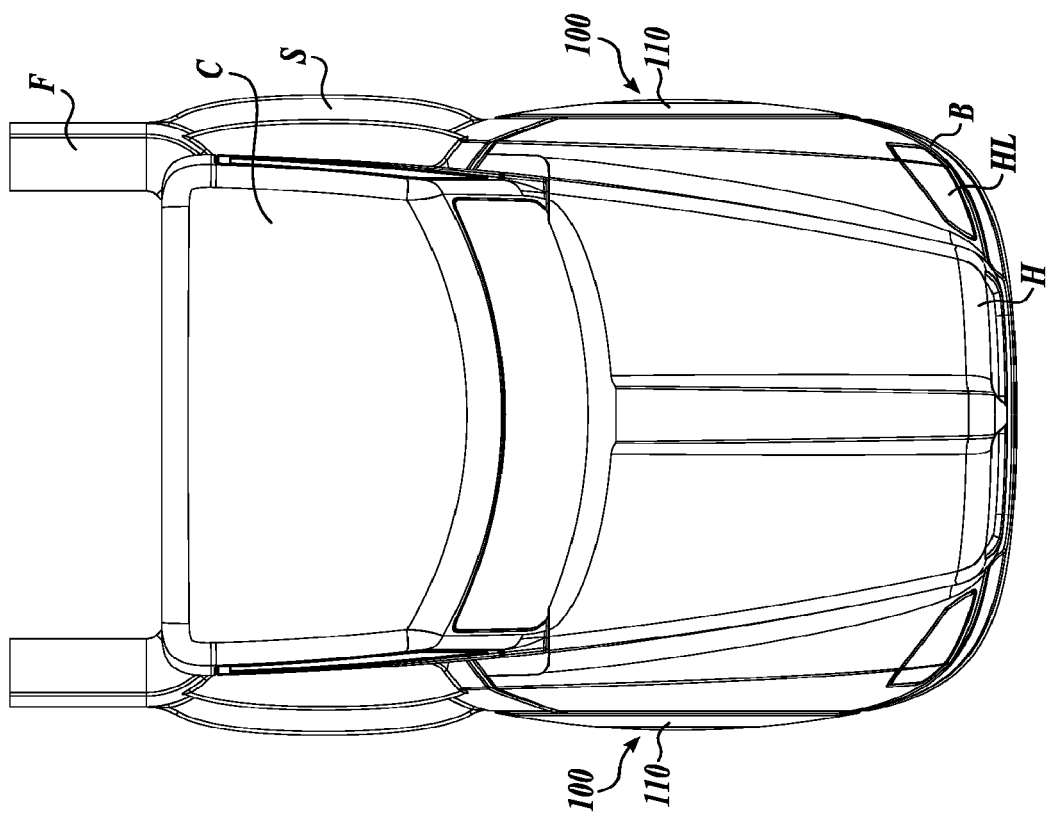
FIG. 2B is a top view of the vehicle having an articulated wheel fairing system of FIG. 1A, showing the articulated wheel fairing system in the second position.

The detailed description set forth below in connection with the appended drawings, where like numerals reference like elements, are intended as a description of various embodiments of the present disclosure and are not intended to represent the only embodiments. Each embodiment described in this disclosure is provided merely as an example or illustration and should not be construed as precluding other embodiments. The illustrative examples provided herein are not intended to be exhaustive or to limit the disclosure to the precise forms disclosed.

In the following description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "forward," "rearward," "front," "rear," "upward," "downward," "top," "bottom," "right hand," "left hand," "lateral," "medial," "in," "out," "extended," etc. These references, and other similar references in the present application, are only to assist in helping describe and to understand the particular embodiment and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The following description provides several examples that relate to systems for reducing the aerodynamic drag of bluff bodies, particularly vehicles having steering systems, where motion of the steer wheel and steer tire, in embodiments that include tires, travel outside of the wheel well during use. In the following description, the embodiments and examples are generally described in reference to the truck or tractor-portion of a heavy-duty, on-highway motor vehicle. However, the present disclosure is not limited to such vehicles, and is suitably used with any vehicle benefiting from a reduction of aerodynamic drag. Embodiments adapted for other vehicles, or any bluff body, are also within the scope of the present disclosure.

The aerodynamic drag created by turbulence from the rotating wheels and wheel wells of the vehicle can significantly reduce the fuel efficiency of the vehicle. To reduce the portion of aerodynamic drag caused by the wheels and wheel wells, vehicle designers have implemented numerous systems. For example, panels that cover the wheel surfaces, fenders designs, fairing panels covering the non-steerable wheels, and other systems have been employed. However, complications arise when similar systems are adapted to the steerable wheels of the vehicle. In particular, the tire envelope (e.g. "tire blob") is significantly larger as a result of steering angle and suspension travel during cornering. In this regard, considerations for steer wheel and steer tire clearance are critical, and clearances must be maintained at the extreme tire envelope, such as when the steer wheel is fully turned to the locked position and the suspension is in a fully extended or compressed state. The resulting complexities have limited the ability to apply aerodynamically beneficial systems to the steer axle of a vehicle.

The following description provides several examples that relate to articulated wheel fairings for decreasing the drag associated with the steer wheels, tires, and wheel wells of a vehicle. Embodiments of the present disclosure are generally directed to fairing panels that articulate in reaction to a steering input of a steering system of a vehicle. Since aerodynamic drag increases with vehicle speed, the greatest benefit by a system for reduction in aerodynamic drag occurs at higher speeds of the vehicle, such as when driving on a freeway. At these higher speeds, the steering system of the vehicle is generally at or near a neutral steering input since the vehicle cannot safely be turned sharply at the high speeds. As a result, some embodiments of the systems of the present disclosure are configured to provide the largest reduction of aerodynamic drag when the steering system of the vehicle is at or near the neutral steering input position. In these embodiments, the minimized gap between the vehicle hood and the articulated wheel fairing improves the aerodynamic performance, because the airflow transfers from the fender of the hood of the vehicle to the articulated wheel fairing system smoothly. In some embodiments, the reduction of aerodynamic drag is greater than 1%. In other embodiments, the reduction in aerodynamic drag is greater than 2.5%. Still, in further embodiments the aerodynamic drag reduction is variable based on any number of vehicle factors, such as vehicle configuration, speed, altitude, driver input, temperature, and the like.

At slower vehicle speeds, when the aerodynamic drag influence on fuel economy is reduced, and greater steering input is required, the systems of the present disclosure are configured to provide clearance from the steering components such that the steer tire and steer wheel can pivot and articulate freely at a non-neutral steering input and suspension state. To create the clearance from the steering components, the fairing panel is configured to articulate away from a side of the vehicle in reaction to non-neutral steering input. In this regard, as the driver turns the steering wheel away from the neutral steering input position, the fairing panel articulates away from the side of the vehicle to provide the clearance to the steering components, namely the steer tire. Then, as the driver returns the steering wheel to the neutral steering input position, the fairing panel articulates back to a position nearer and adjacent to the steering components to provide the reduction in aerodynamic drag. In other aspects, the present disclosure is configured to reduce the splash and spray generated by turbulence and tire contact with a road surface when the vehicle is operating in wet and rainy conditions.

In the FIGURES, representative embodiments having a shaft configured to transfer movement of the steering system to articulation of the fairing panel are shown. However, in other embodiments, any suitable link between the articulated fairing panel and the steering system of the vehicle is within the scope of the present disclosure. Likewise, in the representative embodiments shown in the FIGURES, a mechanical linkage is shown between the vehicle and the fairing panel. However, in other embodiments, any suitable coupling that allows for articulation of the fairing panel is within the scope of the present disclosure. In these other embodiments, an actuator may be used to articulate the fairing panel. In this regard, the actuator can be of the hydraulic type, electronic type, pneumatic type, and combinations thereof. In some embodiments, the actuator is coupled to the fairing panel and to the vehicle and is configured to move the fairing panel to positions that are continuously variable between the first and second positions. In further embodiments, the wheel fairing system controls a position of the actuator in response to a signal indicative of steering angle of the steering system. In these embodiments, the signal may be produced by any suitable sensor of the vehicle or steering system.

Figure 3B:
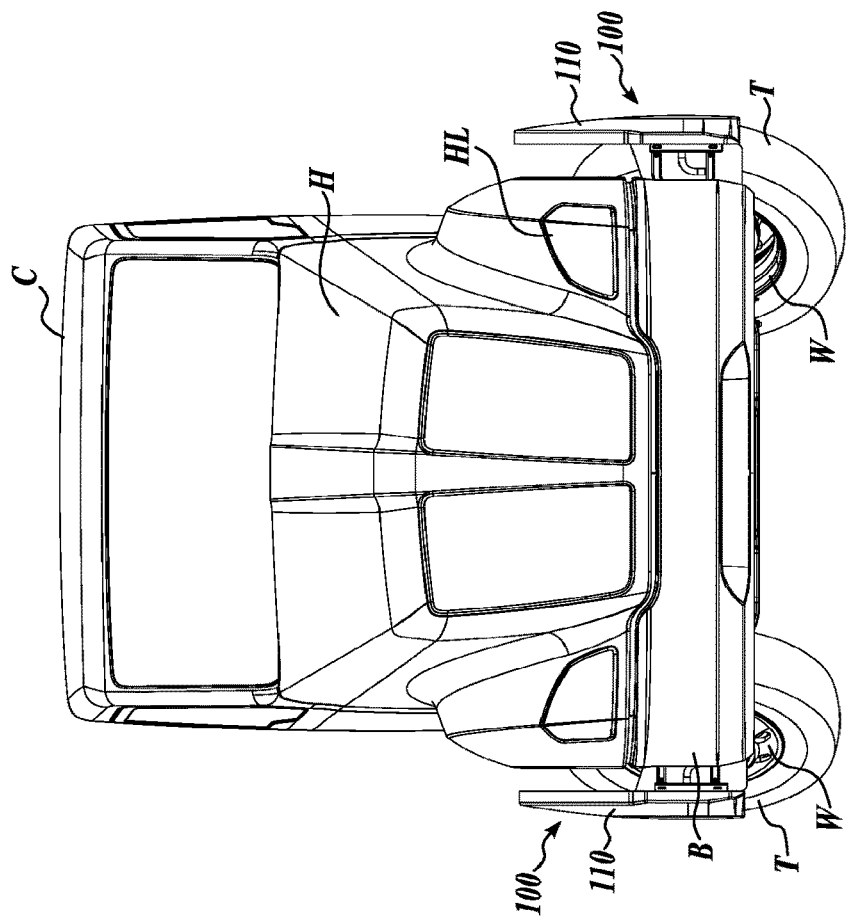
FIG. 3B is a front view of the vehicle having an articulated wheel fairing system of FIG. 1A, showing the articulated wheel fairing system in the second position.
Figure 3A:
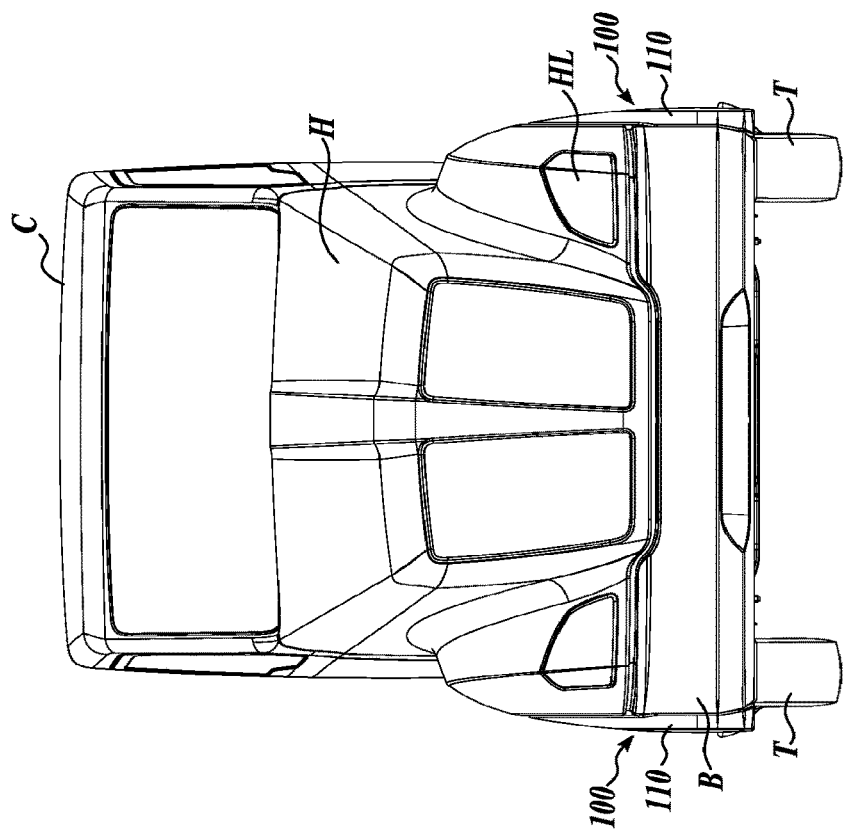
FIG. 3A is a front view of the vehicle having an articulated wheel fairing system of FIG. 1A, showing the articulated wheel fairing system in the first position.

Turning to FIGS. 1A through 3B, a representative embodiment of an articulated wheel fairing system 100, suitable for use with a vehicle having a steering system, is shown. In this example, the vehicle generally includes a cab C, a hood H, a headlight HL, a bumper B, a fairing F, a step S, and a steering wheel assembly comprised of, for example, a steer wheel W and a steer tire T. FIGS. 1A, 2A, and 3A show the articulated wheel fairing system 100 in a first position, or a first state, where the steering system is in or near a neutral steering input position, such as when the vehicle is traveling straight or turning gradually. FIGS. 1B, 2B, and 3B show the articulated wheel fairing system 100 in a second position, or a second state, where the steering system is in a non-neutral steering input position, such as when the vehicle is turning more sharply than in the first position. As shown in the transition from FIG. 1A to 1B, FIG. 2A to 2B, and FIG. 3A to 3B, illustrated embodiments of the articulated wheel fairing system 100 transition to any position between the first position (1A, 2A, and 3A) and the second position (1B, 2B, and 3B) in reaction to the position of the steering system.

Figure 4A:
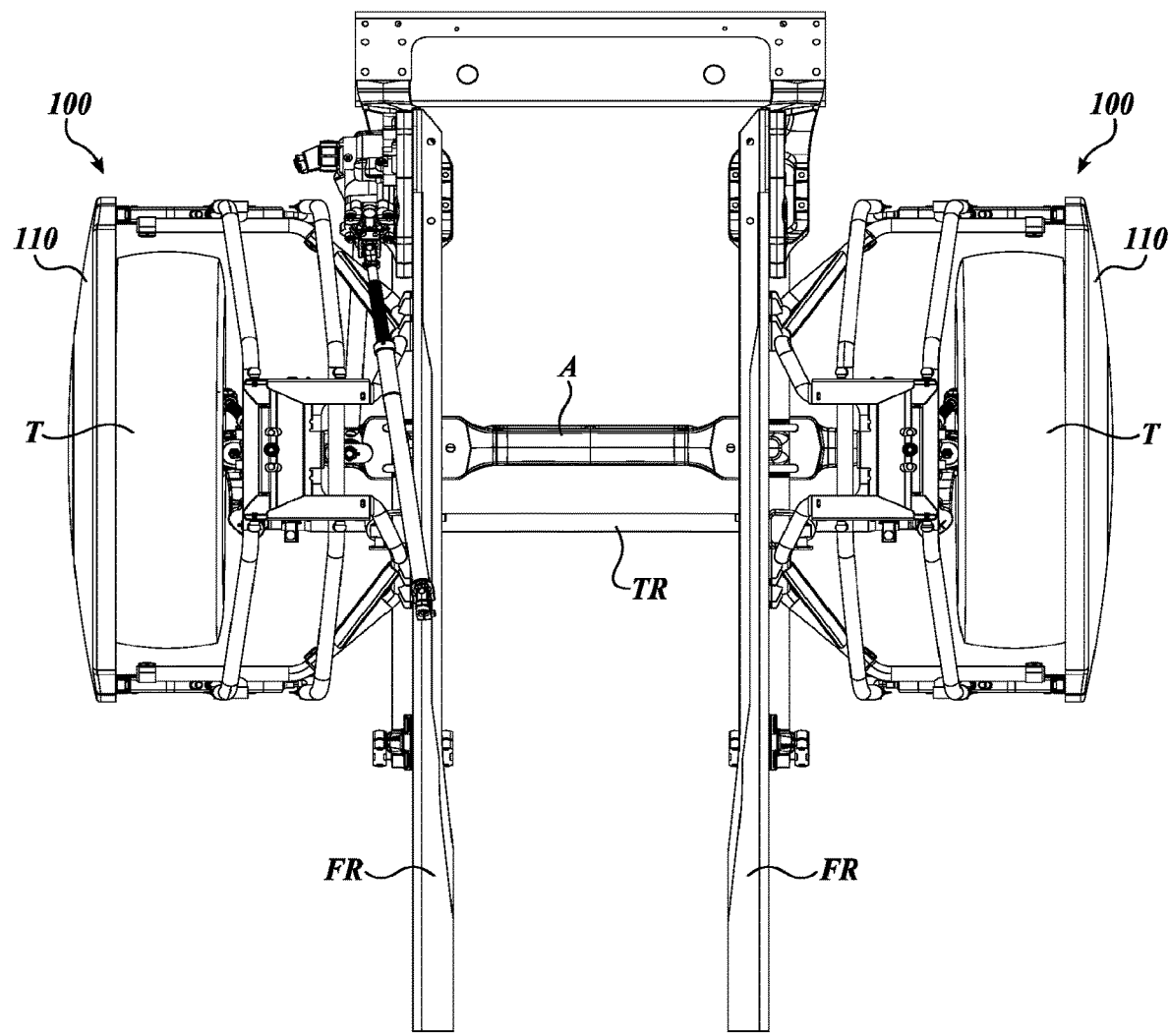
FIG. 4A is a top view of another representative embodiment of a vehicle having an articulated wheel fairing system in accordance with aspects of the present disclosure, showing the articulated wheel fairing system in a first position.
Figure 4B:
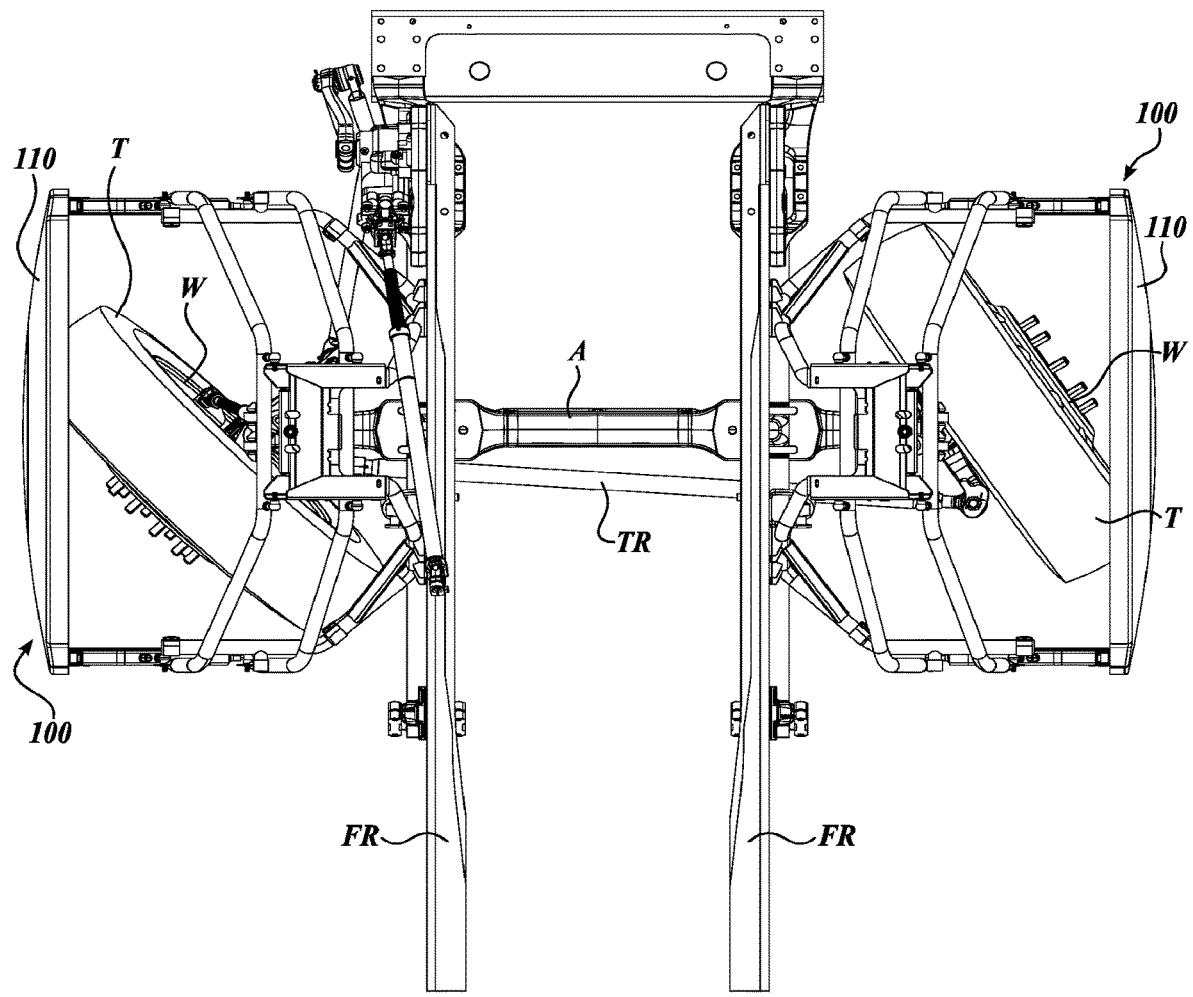
FIG. 4B is a top view of the vehicle having an articulated wheel fairing system of FIG. 4A, showing the articulated wheel fairing system in the second position.

Referring now to FIGS. 4A and 4B, the articulated wheel fairing system 100 of the present disclosure is shown with the various external components of the vehicle hidden. The articulated wheel fairing system 100 is configured to maintain the track width and turn angle of the vehicle while minimizing increase in the vehicle width. In some embodiments, the fairing panel is supported at the leading and trailing edges for stability. In embodiments having a mechanical linkage, as will be explained in greater detail below, pivot joints are included to facilitate articulation. In these embodiments, the articulation of the system moves the fairing panel both outward and upward, away from the wheel, which prevents contact between the components. In other embodiments, the articulation of the system moves the fairing panel in any direction, or combinations thereof, to provide the clearance for the steering and suspension system articulation. The aforementioned outward and upward motion also minimizes the potential for snow and ice buildup within the wheel well, which would limit the travel of the fairing panel. In another embodiment, a heating system (not shown) is included to reduce snow and ice buildup at the interface between the fairing panel and the hood, reducing the potential for snow and ice to restrict movement of the fairing panel. In some embodiments, the fairing panel is secured to the vehicle with a series of removable fasteners, such as spring clips, which allow removal of the fairing panel to service the steer wheel, steer tire, axle, brake system, or other steering or suspension components.

In some embodiments, the articulated wheel fairing system 100 generally includes a fairing panel 110 to provide the function of providing an aerodynamic surface covering the wheel well and at least partially covering the steer wheel W and/or steer tire T of the steering system. As shown, the vehicle generally includes a frame FR, and the steering system generally includes an axle A and a tie rod TR. As before, FIG. 4A shows the articulated wheel fairing system 100 in the first position, and FIG. 4B shows the articulated wheel fairing system 100 and the second position. Although the second position as shown in the FIGURES is generally a fully articulated steering position (e.g., full lock), the second position is intended to represent any position of the articulated wheel fairing system 100 that is positioned a distance away from the first position, in the direction away from the side of the vehicle (e.g., away from the steer wheel W, steer tire T, and other steering system and braking components). The components of one representative embodiment of the articulated wheel fairing system 100 will now be described in greater detail.

Figure 5:
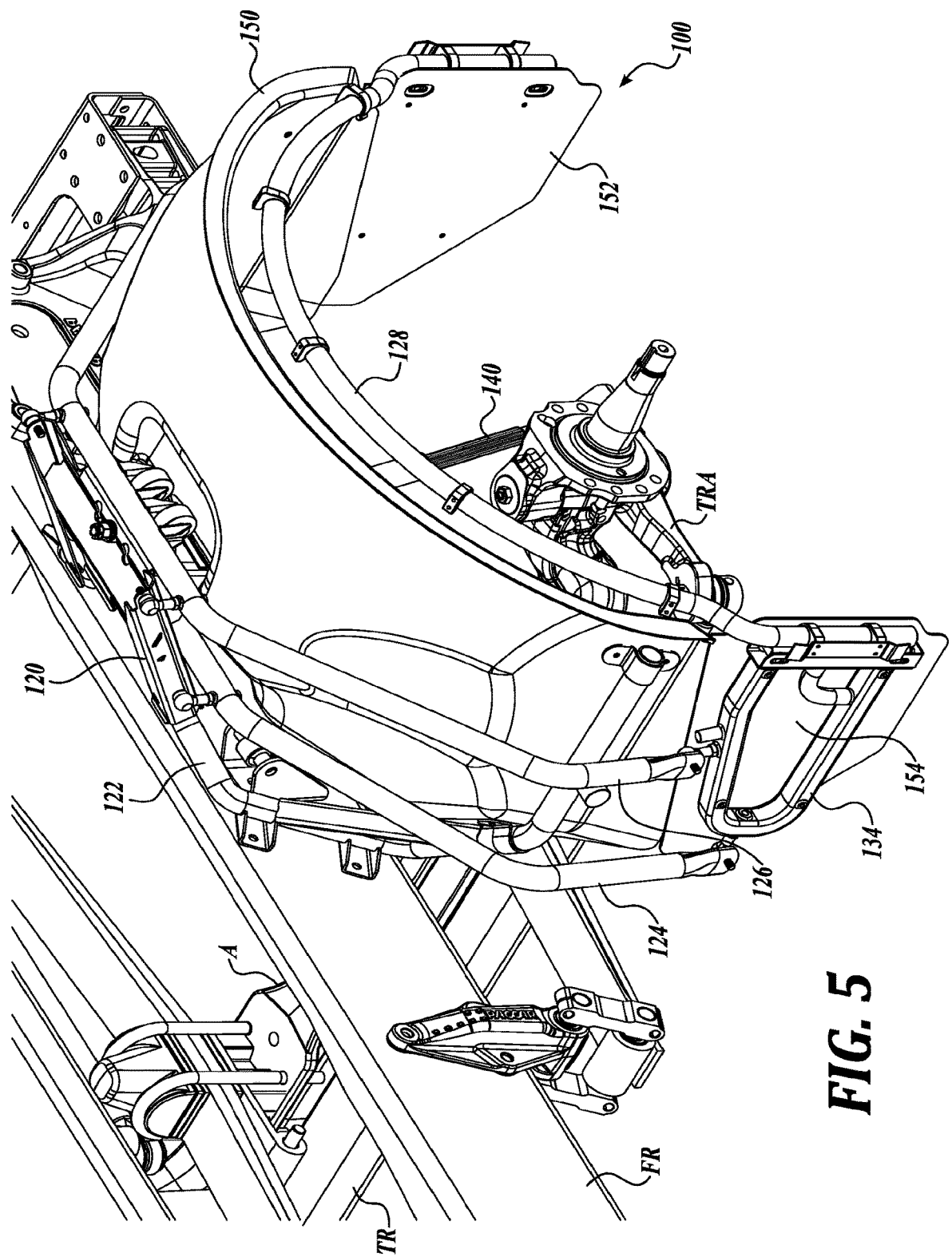
FIG. 5 is a left rear top perspective view of the articulated wheel fairing system of FIG. 4A, showing a fitted splash shield.

Turning now to FIG. 5, the articulated wheel fairing system 100 is shown having an upper splash shield 150, a forward splash shield 152, and a rear splash shield 154. The splash shields 150, 152, and 154 are configured to reduce the splash and spray generated when the vehicles operating wet and rainy conditions. In some embodiments, the splash shields 150, 152, and 154 are positioned between the steer tire T and the components of the articulated wheel fairing system 100. In other embodiments, splash shields are positioned in any location to suitably reduce the splash and spray generated as a vehicle is driven.

Figure 6:
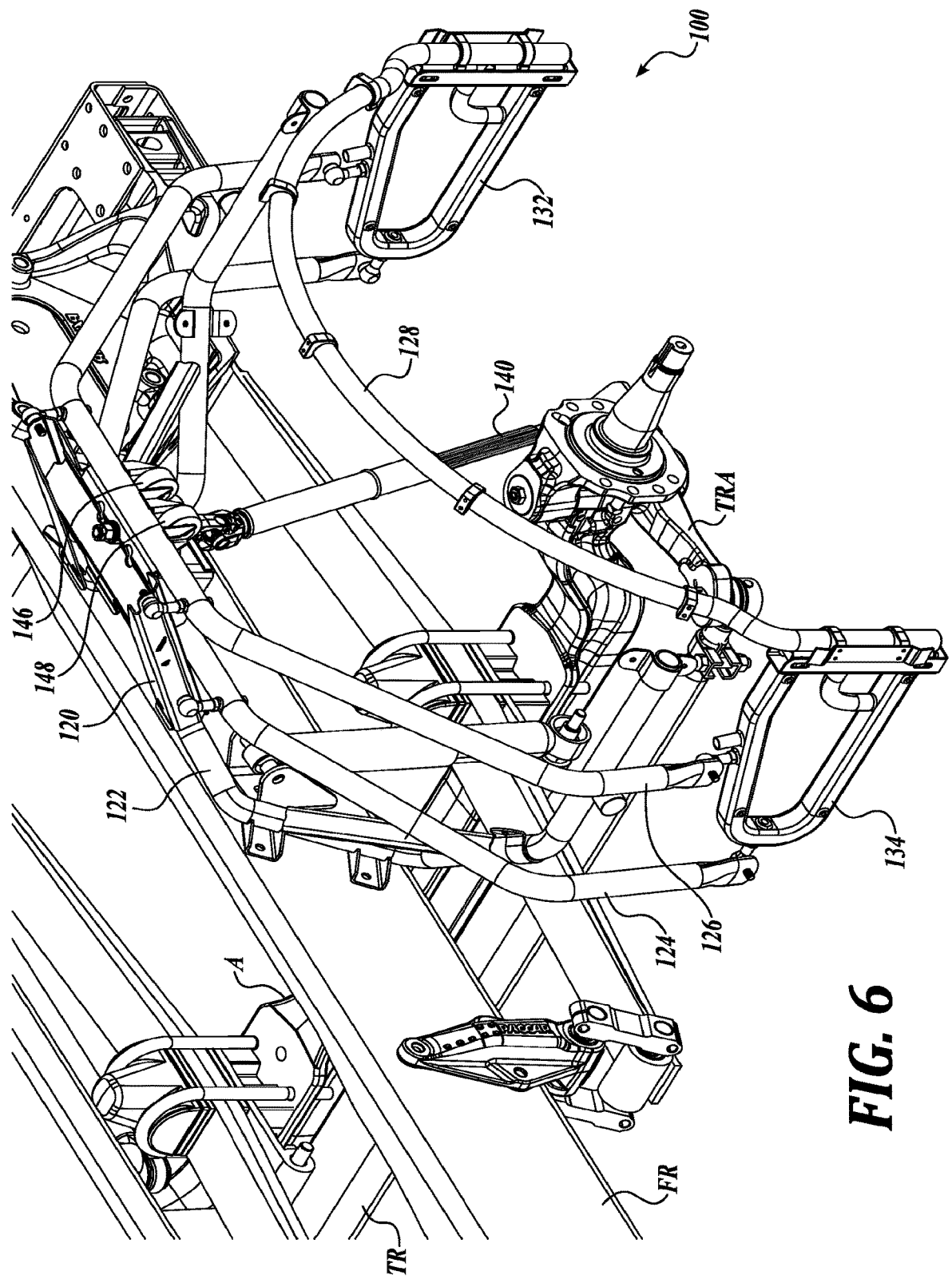
FIG. 6 is a left rear top perspective view of the articulated wheel fairing system of FIG. 4A, showing the splash shield omitted.

Referring to FIG. 6, the articulated wheel fairing system 100 generally includes an upper bracket 120, a stationary frame 122, a first pivoting frame 124, a second pivoting frame 126, a fairing panel support frame 128, a forward bracket 132, a rear bracket 134, a first interacting member 146, and a second interacting member 148. In the illustrated embodiments, the fairing panel support frame 128 is configured to couple the fairing panel 110 to the articulated wheel fairing system 100, such that the fairing panel 110 moves between the first position and the second position based on input to the steering system. In other embodiments, the fairing panel 110 has an integrated support frame and couples directly to the other components of the system, while omitting the fairing panel support frame 128. Although the first and second interacting members 146 and 148 are generally shown as wheels, in other embodiments, the first and second interacting members 146 and 148 are any suitable member to transfer motion into the first and second pivoting frames 124 and 126. The configuration of the first and second pivoting frames 124 and 126 is generally referred to as a pantograph shape. However, in other embodiments, any shape, configuration, or number of frame members configured to articulate the fairing panel 110 from the first position to the second position is also within the scope of the present disclosure.

As shown in FIG. 7, the articulated wheel fairing system 100 includes components to transfer the movement of the steering system of the vehicle to the fairing panel 110. In some embodiments the axle A of the steering system includes a tie rod arm TRA to translate the axial movement of the tie rod TR to the outer components of the steering system, namely the steer wheel W and the steer tire T. In some embodiments, a shaft bracket 138 is mounted to the outer component of the steering system. The shaft bracket 138 is coupled to an end of the lower joint 160, which carries an extendable shaft 140. The extendable shaft 140 is configured to rotate in reaction to rotation of the steering system of the vehicle, e.g., when the steer wheel W and steer tire T are turned during steering (e.g., non-neutral steering input) of the vehicle. In some embodiments, the extendable shaft 140 includes the lower joint 160 and an upper joint 162 (see FIG. 9A). In these embodiments, the lower and upper joints 160 and 162 are suitably universal joints, allowing rotation of the extendable shaft 140 throughout various angles. In other embodiments, the lower and upper joints 160 and 162 are any flexible joint configured to allow movement and rotation of the extendable shaft 140.

In the illustrated embodiments, the upper end of the extendable shaft 140 is coupled to the upper joint 162, and the upper end of the upper joint 162 is coupled to a rotatable bracket assembly 164. In these embodiments, the rotatable bracket assembly 164 includes a first lever 142 configured to interface with the first interacting member 146, and a second lever 144 configured to interface with the second interacting member 148. In the illustrated embodiment, the first and second levers 142 and 144 are wheels configured to press against the first and second interacting members 146 and 148, to cause the components of the articulated wheel fairing system 100 to move from the first position to the second position.

The steering motion described herein generally refers to motion that is a result of steering input to the steering system of the vehicle. In one example, as an operator turns the steering wheel of the vehicle, the steering system reacts to cause the vehicle to steer in proportion to the amount of input to the steering wheel by the operator. In the embodiments herein, the neutral steering input of the steering system of the vehicle refers to a state where the steering is substantially centered such that the vehicle travels in a generally straight direction. In these embodiments, the neutral steering input position should be construed as having a steering angle at the steer wheel W and steer tire T between about 0° and about 10° from the direction of vehicle travel, in either turning direction. In this regard, the fairing panel 110 may not react, or move, as a result of small changes in the steering system angle. The point in the steering angle where the fairing panel 110 begins to move from the first position to the second position is dependent on the clearances, design, and requirements of the articulated wheel fairing system 100. Likewise, the non-neutral steering input position should be construed as a steering angle outside of neutral steering input position. In one example, the non-neutral steering input position is greater than about 10° from the direction of vehicle travel, in either direction. In other embodiments, the fairing panel 110 begins to move from the first position to the second position at any steering angle greater than 0°.

Figure 8A:
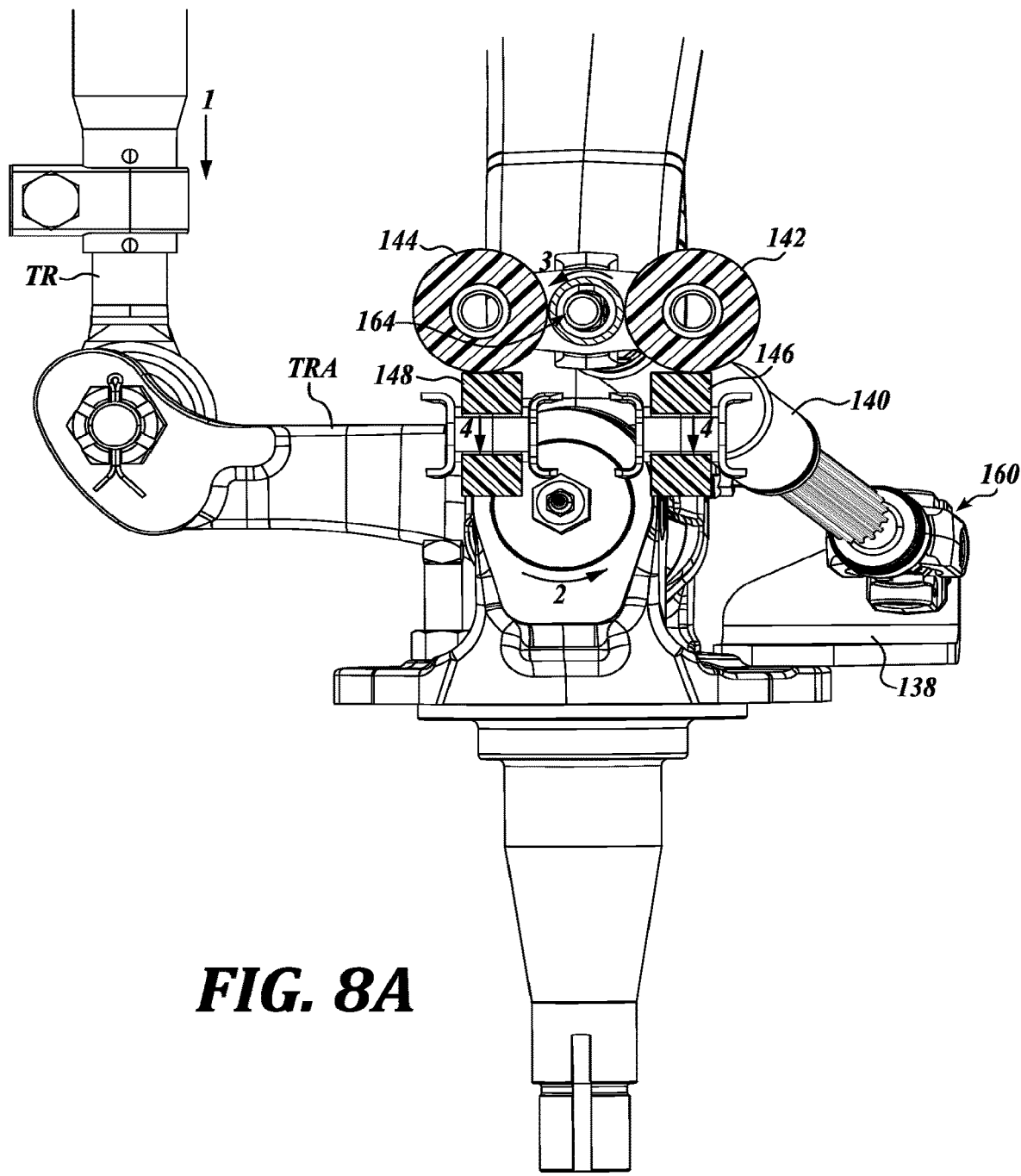
FIG. 8A is a cutaway left top view of the articulated wheel fairing system of FIG. 6, showing the articulated wheel fairing system in the first position.
Figure 8B:
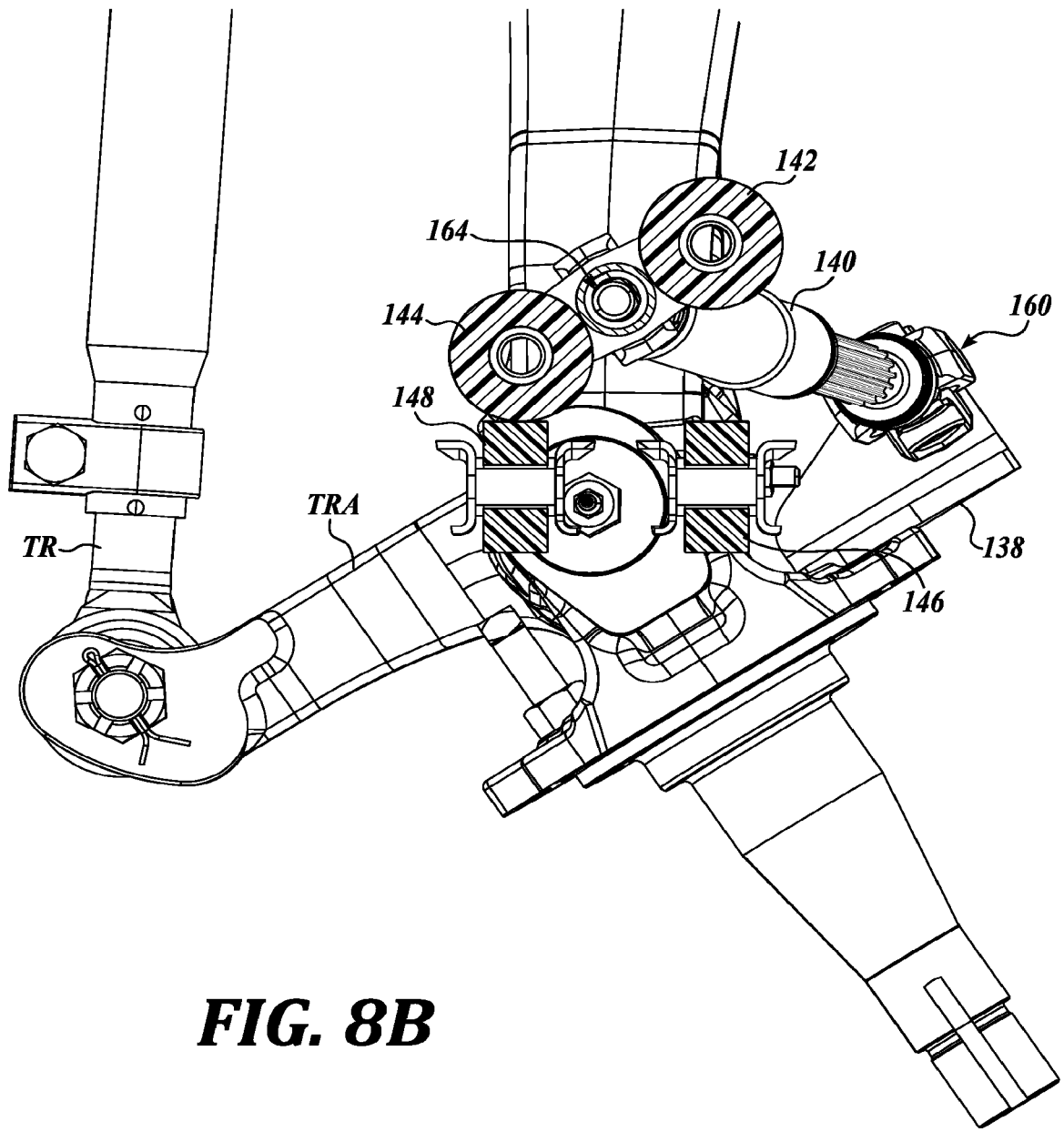
FIG. 8B is a cutaway left top view of the articulated wheel fairing system of FIG. 6, showing the articulated wheel fairing system in the second position.

Referring now to FIG. 8A, the sequence of the transfer of steering motion to the fairing panel 110 for the illustrated embodiments of the articulated wheel fairing system 100 will be described in detail. In the system shown, the initial steering motion begins in the tie rod TR at arrow 1 as a substantially axial translation. The components causing the tie rod TR to translate are not shown (e.g., steering wheel, steering box, steering column, etc.). The motion at arrow 1 causes the tie rod arm TRA to rotate at arrow 2 about a central axis (not shown). The rotation at arrow 2 is transferred to the shaft bracket 138, which causes the lower and upper joints 161 and 162, the shaft 140, and the rotatable bracket assembly 164 to rotate in the direction of arrow 3. The rotation of the rotatable bracket assembly 164 in the direction of arrow 3 causes a transfer of motion between the second lever 144 and the second interacting member 148 in the direction of arrow 4. Although the illustrated embodiments show examples where a transfer of motion when the steering system causes the vehicle to turn to the vehicle's left, a similar sequence occurs when the steering system causes the vehicle to turn to the vehicle right, but certain of the directions are reversed. In this regard, counter rotation of the rotatable bracket assembly 164 in the opposite direction of arrow 3 causes a transfer of motion between the first lever 142 and the first interacting member 146, also in the direction of arrow 4. One representative resultant second position after the sequence is performed is shown in FIG. 8B, illustrating a left turning position in reference to the vehicle's forward path of travel.

Figure 9A:
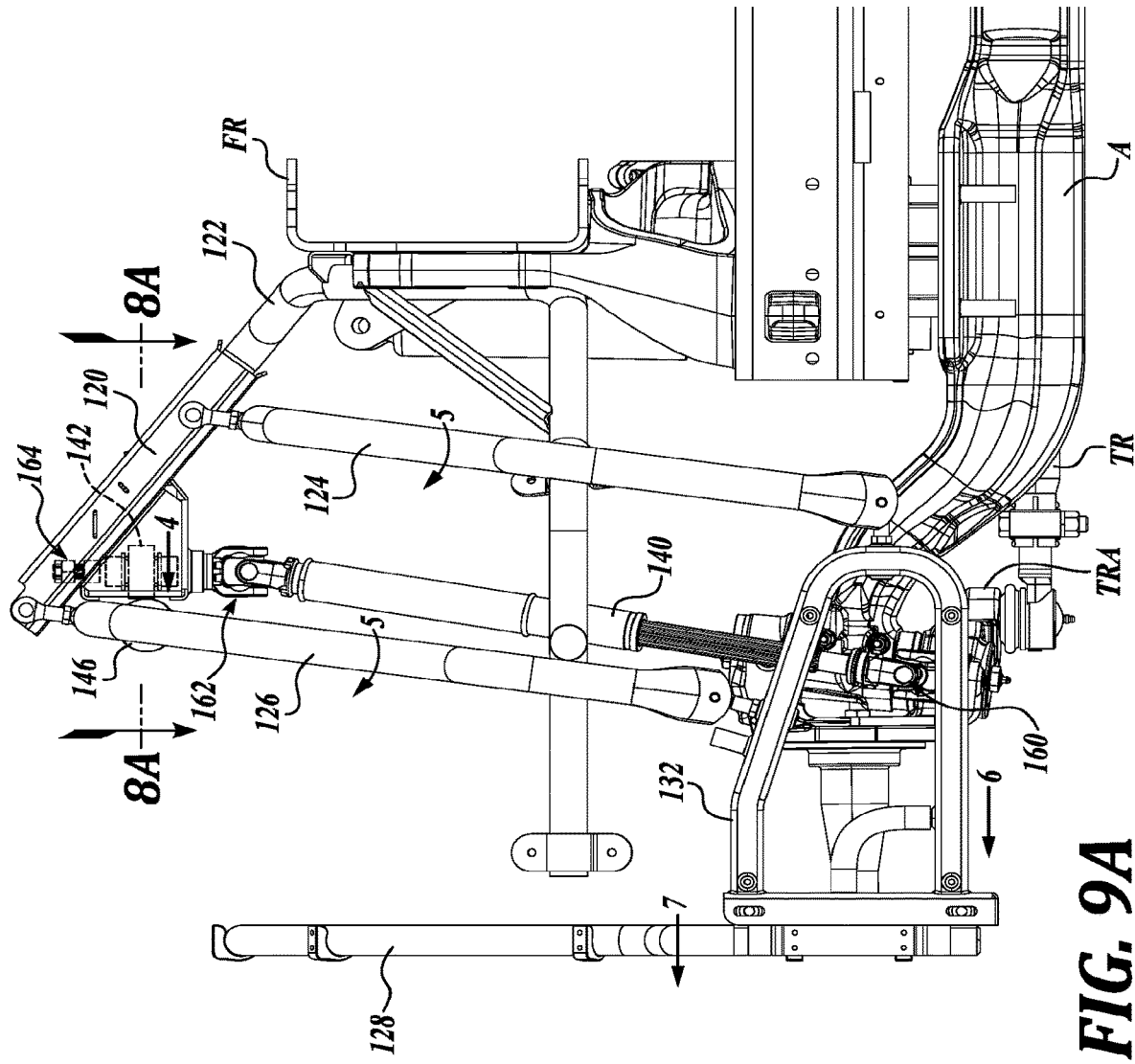
FIG. 9A is a front view of the articulated wheel fairing system of FIG. 6, showing the articulated wheel fairing system in the first position.

The sequences continue in FIG. 9A, where the translation of the second interacting member 148 in the direction of arrow 4 is repeated. The translation in the direction of arrow 4 causes the first and second pivoting frames 124 and 126 to pivot in a direction of arrow 5. In the pentagram configuration illustrated in the FIGURES, the pivot of the first and second pivoting frames 124 and 126 in the direction of arrow 5 causes the fairing panel 110 to move outward from the side of the vehicle (x-direction) while also moving upward from the ground (z-direction). In other configurations, the fairing panel 110 may only move outward from the side of the vehicle, or in any suitable direction to provide clearance to the steer tire T and the steering wheel W. The pivoting in the direction of arrow 5 causes the forward bracket 132 to translate in the direction of arrow 6. As noted above, the translation of the forward bracket 132 the direction of arrow 6 may include a component tending to move the bracket 132 upward and away from the ground (z-direction). Finally, the translation in the direction of arrow 6 causes the fairing panel support frame 128, and the coupled fairing panel 110, to translate in the direction of arrow 7. As with the direction of arrow 6, the direction of arrow 7 may include a component tending to move the fairing panel support frame 128 upward and away from the ground (z-direction). One exemplary resultant second position, after the sequence is performed, is shown in FIG. 9B, illustrating a left turning position in reference to the vehicle's forward path of travel, and showing the difference between the first position of the fairing panel support frame 128 (in phantom line), and the second position of the fairing panel support frame 128 (in solid line).

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The invention claimed is:

1. A vehicle, comprising:
a frame;
a wheel well;
a tie rod;
a tie rod arm mechanically coupled to the tie rod;
a wheel hub assembly in the wheel well and mechanically coupled to the tie rod arm;
a steer wheel in the wheel well, the steer wheel mechanically coupled to the wheel hub assembly;
a wheel fairing system mounted to the vehicle, the wheel fairing system including:
  a stationary frame fixedly mounted to the frame;
  a mounting bracket coupled to the stationary frame;
  a pivoting frame pivotally coupled to the mounting bracket;
  an interacting member coupled to the pivoting frame;
  an extendable shaft including a first end and a second end opposite to the first end;
  a rotatable bracket assembly in mechanical cooperation with the first end of the extendable shaft, the rotatable bracket assembly including:
    a lever that mechanically cooperates the interacting member; and
  a shaft bracket coupled to the wheel hub assembly and coupled to the second end of the extendable shaft.

2. The vehicle of claim 1, further comprising:
a first joint coupled to the first end of the extendable shaft, the first joint coupling the first end to the rotatable bracket assembly; and
a second joint at the second end of the extendable shaft, the second joint coupling the second end to the shaft bracket.

3. The vehicle of claim 1, wherein the extendable shaft has a first portion and a second portion telescopically inset within the first portion, the second portion configured to slide in and out of the first portion.

4. The vehicle of claim 1, further comprising:
an articulation bracket coupled to the pivoting frame;
a support frame coupled to the articulation bracket, the support frame mechanically cooperates with the pivoting frame through the articulation bracket; and
a fairing panel coupled to the support frame, the fairing panel aligned with the wheel well.

5. The vehicle of claim 4, wherein the pivoting frame, the articulation bracket, the support frame, and the fairing panel have a first position and a second position.

6. The vehicle of claim 5, wherein:
when the fairing panel in the first position, the fairing panel covers the wheel well; and
when the fairing panel is in the second position, the fairing panel exposes the wheel well.

7. The vehicle of claim 6, wherein:
when the vehicle is being driven straight, the fairing panel is in the first position; and
when the vehicle is turning, the fairing panel is in the second position.

8. The vehicle of claim 5, wherein:
when the vehicle is turning in a first direction, the shaft extends and rotates moving the pivoting frame, the articulation bracket, the support frame, and the fairing panel from the first position toward the second position; and
when the vehicle is turning in a second direction opposite to the first direction, the shaft compresses and rotates moving the pivoting frame, the articulation bracket, the support frame, and the fairing panel from the first position to the second position.

9. The vehicle of claim 8, wherein when the shaft extends and rotates in the first direction, the lever pushes against the interacting member moving the pivoting frame, the articulation bracket, the support frame, and the fairing panel from the first position to the second position.

10. The vehicle of claim 8, wherein when the shaft compresses and rotates in the second direction, the lever pushes against the interacting member moving the pivoting frame, the articulation bracket, the support frame, and the fairing panel from the first position to the second position.

* * * * *